United States Patent [19]
Tsai

[11] Patent Number: 5,347,952
[45] Date of Patent: Sep. 20, 1994

[54] MINI TYPE AQUARIUM

[76] Inventor: Yung C. Tsai, 39, Shin Shing Lane, Dong Shan Rd., Ching Shui, Tiachung County, Taiwan

[21] Appl. No.: 130,998
[22] Filed: Oct. 4, 1993
[51] Int. Cl.⁵ .............................................. A01K 63/00
[52] U.S. Cl. .................................................... 119/246
[58] Field of Search ............... 119/245, 246, 247, 248, 119/253, 254, 255

[56] References Cited

U.S. PATENT DOCUMENTS

| | | | |
|---|---|---|---|
| D. 78,595 | 5/1929 | Tauman | 119/247 X |
| 3,538,888 | 11/1970 | Speshyock | 119/247 |
| 4,026,243 | 5/1977 | Jessop, III | 119/246 |
| 4,612,876 | 9/1986 | Tigert | 119/253 |
| 5,127,366 | 7/1992 | Kim | 119/246 |
| 5,174,239 | 12/1992 | Sato | 119/253 X |

Primary Examiner—Thomas Price

[57] ABSTRACT

An aquarium includes an air pump received in a base, a support has a lower end fixed to the base, a container is coupled to the upper end of the support, a hole is formed in the upper portion of the container for pouring water into the container, a check valve is disposed in the bottom portion of the container and has a lower end connected to the air pump for supplying air into the container. A number of light bulbs are disposed in the lower portion of the container for warming up the water contained in the container. The aquarium includes a compact configuration which is good for transportation purposes.

1 Claim, 4 Drawing Sheets

MINI TYPE AQUARIUM

BACKGROUND OF THE INVENTION

1. Field of the Invention

The present invention relates to an aquarium, and more particularly to a mini type aquarium.

2. Description of the Prior Art

Typical aquariums comprise a large volume such that they are not portable, the users may not carry fish with them in the aquariums.

The present invention has arisen to mitigate and/or obviate the afore-described disadvantages of the conventional aquariums.

SUMMARY OF THE INVENTION

The primary objective of the present invention is to provide an aquarium which occupies a small volume and which can be easily carried.

In accordance with one aspect of the invention, there is provided an aquarium comprising a base, an air pump received in the base, a support including a lower end engaged in the base and including an upper end, a container including an upper portion coupled to the upper end of the support and including a bottom portion, a hole formed in the upper portion of the container, a check valve disposed in the bottom portion of the container and extended upward into the container and including a lower end connected to the air pump for supplying air into the container. The container includes a lower portion having at least one cavity formed therein, and a light bulb received in the cavity of the container. The container further includes an opening formed in the upper portion for insertion of flowers.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
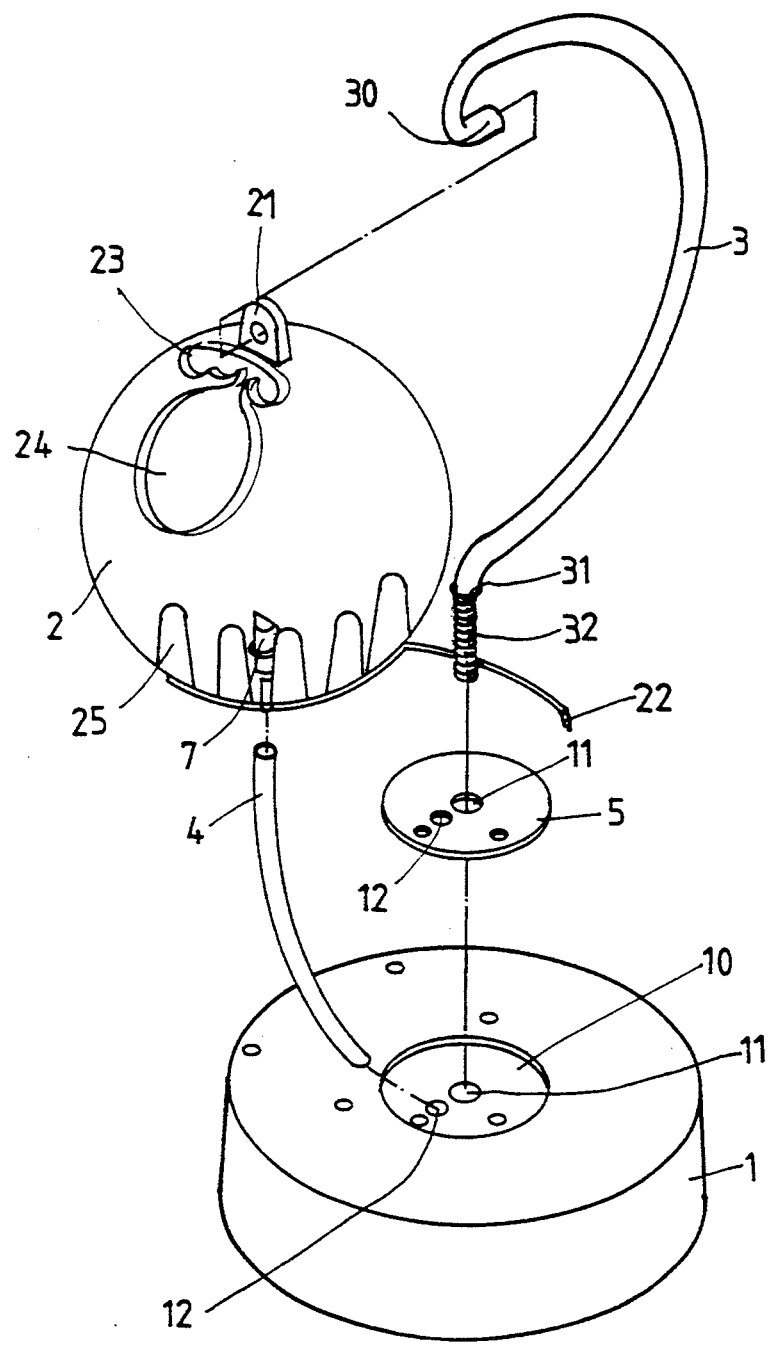
FIG. 1 is an exploded view of an aquarium in accordance with the present invention.
Figure 2:
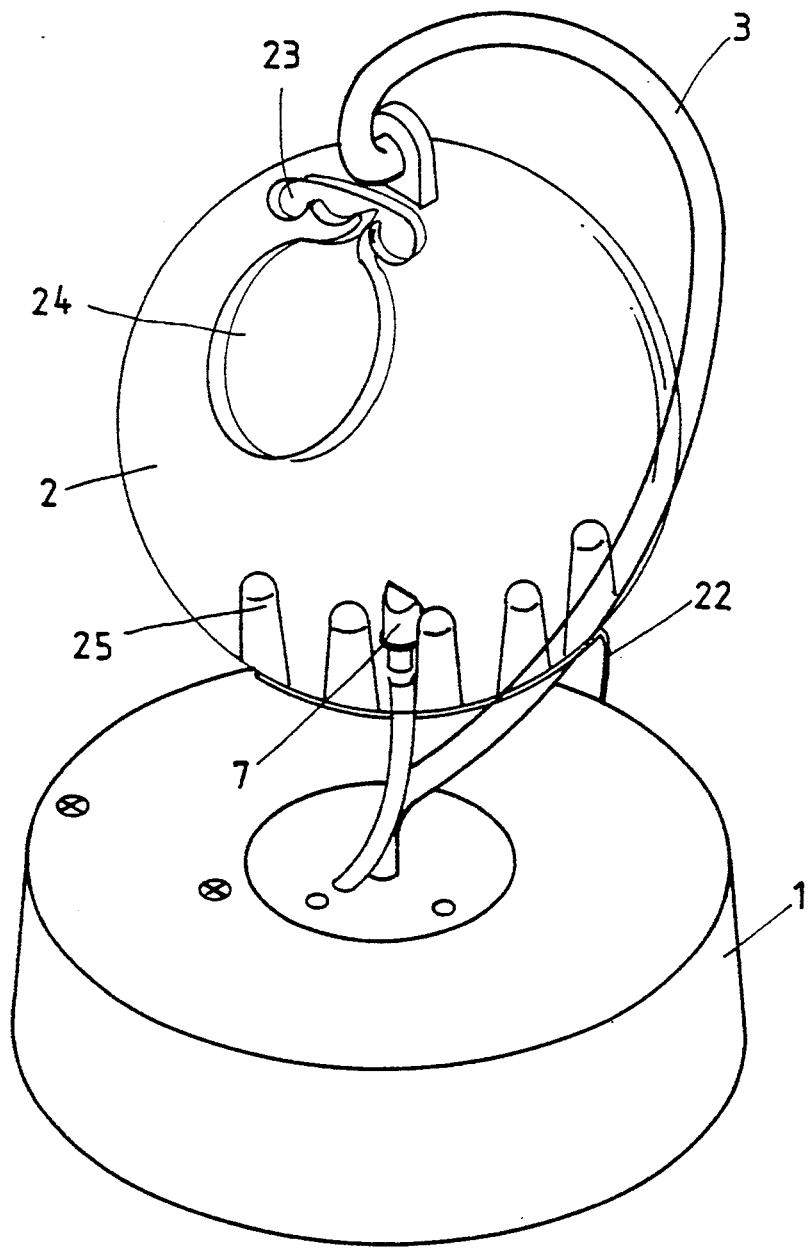
FIG. 2 is a perspective view of the aquarium.
Figure 3:
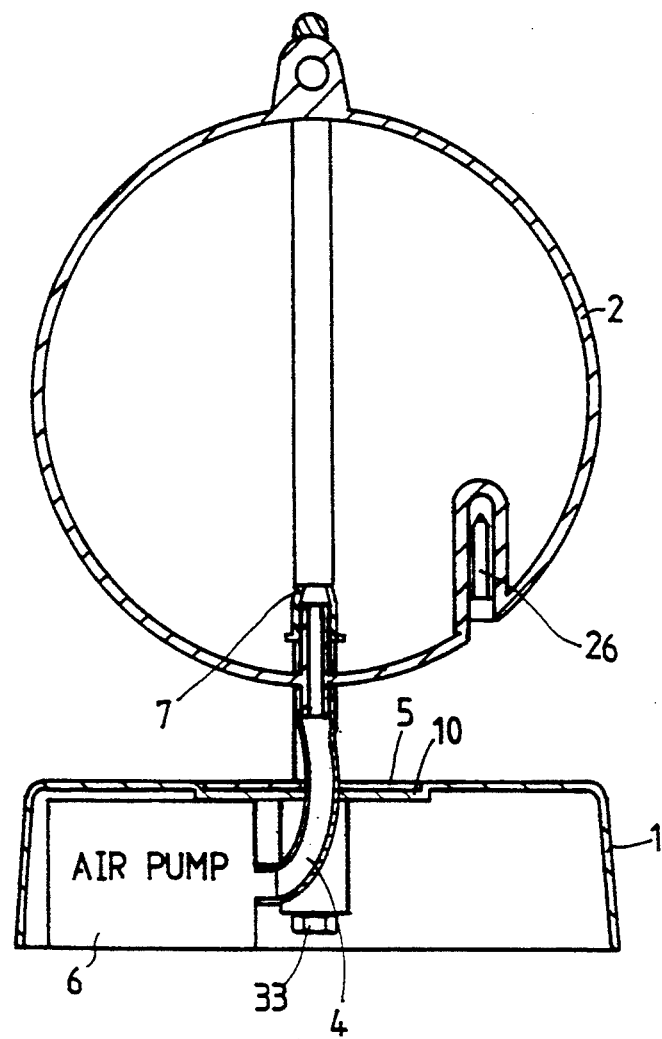
FIG. 3 is a cross sectional view of the aquarium.
Figure 5:
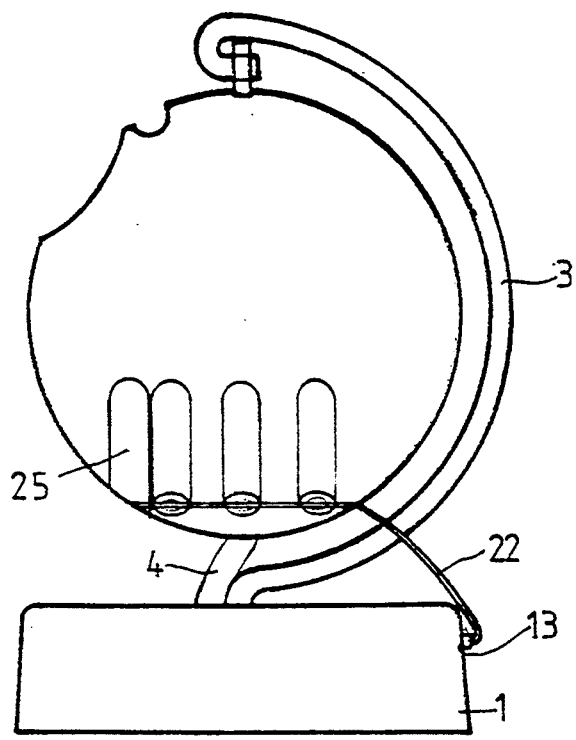
FIG. 5 is a side view of the aquarium.

Referring to the drawings, and initially to FIGS. 1 to 3, an aquarium in accordance with the present invention comprises a base 1 including an air pump 6 disposed therein, a recess 10 formed in the upper portion of the base 1 for receiving: a disc 5 which is fixed to the base 1 by bolts or screws, an orifice 11 and an aperture 12 formed in the recess 10 and formed in the disc 5, a support 3 including a hook 31 formed in the upper portion and a lower end 32 engaged in the orifices 11 of the base 1 and the disc 5, a flange 31 formed in the lower end portion 32 of the support 3 for engaging with the base 1, and a nut 33 threaded to the lower end 32 of the support 3 for fixing the support 3 to the base 1; a container 2 including an ear 21 provided in the upper portion thereof for engaging with the hook 30 of the support 3 such that the container 2 can be supported by the support 3, an opening 23 and a hole 24 formed in the upper portion of the container 2, a plurality of cavities 25 formed in the lower portion of the container 2 and extended inwards of the container 2, a plurality of light bulbs 26 received in the cavities 25 respectively and coupled together by a wire 22 which is plugged to a socket 13 provided in the base 1 (FIG. 5).

Figure 4:
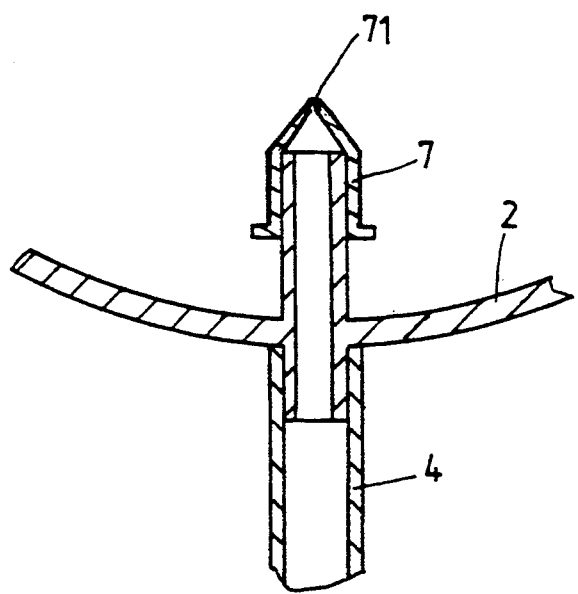
FIG. 4 is a partial cross sectional view of the aquarium.

Referring next to FIG. 4, a check valve 7 is provided in the bottom of the container 2 and includes an upper end extended upward into the container 2 and a slot 71 formed in the upper end thereof, the lower end of the check valve 7 is coupled to the air pump 6 by a hose 4 which is inserted through the apertures 12 of the base 1 and the disc 5.

In operation, water may be poured into the container 2 via the hole 24, the lower portion of flowers may be inserted into the container 2 via the opening 23, when the air pump 6 is energized, air may be produced by the air pump and may be supplied into the container 2 via the hose 4 and the check valve 7, and the light bulbs 26 may emit various kinds of colors when they are energized, and the water of the aquarium may also be warmed up by the light bulbs 26.

Accordingly, the aquarium in accordance with the present invention includes a compact configuration which is good for transportation purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An aquarium comprising a base, an air pump received in said base, a support including a lower end engaged in said base and including an upper end, a container including an upper portion coupled to said upper end of said support and including a bottom portion having at least one cavity formed therein, at least one light bulb received in said cavity of said container, a hole formed in said upper portion of said container, a check valve disposed in said bottom portion of said container and extended upward into said container and including a lower end connected to said air pump for supplying air into said container.

* * * * *